US012727071B2

(12) United States Patent
Laarmann et al.

(10) Patent No.: US 12,727,071 B2
(45) Date of Patent: Sep. 1, 2026

(54) APPARATUS AND METHOD FOR GENERATING X-RAYS BY LASER IRRADIATION OF SUPERFLUID HELIUM DROPLETS

(71) Applicants: Deutsches Elektronen-Synchrotron DESY, Hamburg (DE); Class 5 Photonics GmbH, Hamburg (DE)

(72) Inventors: Tim Laarmann, Hamburg (DE); Robert Riedel, Hamburg (DE); Michael Schulz, Hamburg (DE); Jan Heye Buss, Hamburg (DE)

(73) Assignees: Deutsches Elektronen-Synchrotron DESY, Hamburg (DE); Class 5 Photonics GmbH, Hamburg (DE)

( * ) Notice: Subject to any disclaimer, the term of this patent is extended or adjusted under 35 U.S.C. 154(b) by 545 days.

(21) Appl. No.: 18/025,351

(22) PCT Filed: Sep. 7, 2021

(86) PCT No.: PCT/EP2021/074552
§ 371 (c)(1),
(2) Date: Mar. 8, 2023

(87) PCT Pub. No.: WO2022/053451
PCT Pub. Date: Mar. 17, 2022

(65) Prior Publication Data

US 2023/0328868 A1 Oct. 12, 2023

(30) Foreign Application Priority Data

Sep. 9, 2020 (EP) .................................... 20195288

(51) Int. Cl.
*H05G 2/00* (2006.01)

(52) U.S. Cl.
CPC ........... *H05G 2/003* (2013.01); *H05G 2/0023* (2024.08)

(58) Field of Classification Search
CPC ............................. H05G 2/003; H05G 2/0023
See application file for complete search history.

(56) References Cited

U.S. PATENT DOCUMENTS 6,304,630 B1 10/2001 Bisschops et al.
6,507,641 B1 1/2003 Kondo et al.
(Continued)

FOREIGN PATENT DOCUMENTS

CN 101111118 A 1/2008
JP 2001108799 A 4/2001
JP 2006135298 A 5/2006

OTHER PUBLICATIONS

Japanese Office Action from corresponding JP Patent Application No. 2023-515628 mailed Mar. 5, 2025.
(Continued)

*Primary Examiner* — Georgia Y Epps
*Assistant Examiner* — Hanway Chang
(74) *Attorney, Agent, or Firm* — Caesar Rivise, PC

(57) ABSTRACT

An X-ray laser apparatus (100) for generating X-rays (1) comprises an excitation laser device (10) arranged to generate driving laser pulses (2), and a converter material source device (20) arranged to provide a droplet-shaped converter material, which is capable of generating X-rays (1) by non-linear frequency conversion in response to an irradiation with the driving laser pulses (2), wherein the excitation laser device (10) is arranged for a focused irradiation of the droplet-shaped converter material and the converter material source device (20) is configured to provide superfluid Helium droplets (3), which provide the converter material. Furthermore, a method for generating X-rays (1) is
(Continued)

described, wherein superfluid Helium droplets (3) are utilized as a converter material.

15 Claims, 2 Drawing Sheets

(56) References Cited

U.S. PATENT DOCUMENTS

| | | | | |
|---|---|---|---|---|
| 7,372,056 | B2 | 5/2008 | Bykanov et al. | |
| 7,649,188 | B2 | 1/2010 | Endo et al. | |
| 7,729,403 | B2 | 6/2010 | Rocca et al. | |
| 7,897,947 | B2 | 3/2011 | Vaschenko | |
| 2004/0129896 | A1* | 7/2004 | Schmidt | H05G 2/0094 250/492.2 |
| 2011/0140009 | A1 | 6/2011 | Kaertner et al. | |
| 2015/0168318 | A1 | 6/2015 | Beckman et al. | |
| 2017/0184975 | A1* | 6/2017 | Nikipelov | H01S 3/0903 |

OTHER PUBLICATIONS

English abstract for CN 101111118 A (2008).

Corkum (1993). Plasma perspective on strong field multiphoton ionization. Phys. Rev. Lett., 71(13) 1994-1997.

Haeften et al. (2011). Size and isotope effects of helium clusters and droplets: identification of surface and bulk-volume excitations. J. Phys. Chem. A, 115, 7316-7326.

Joppien et al. (1993). Electronic excitations in liquid helium: the evolution from small clusters to large droplets. Phys. Rev. Lett., 71(16), 2654-2657.

Luu et al. (2018). Extreme-ultraviolet high-harmonic generation in liquids. Nat. Commun., 9, 3723.

Pentlehner et al. (2009). Rapidly pulsed helium droplet source. Rev. Sci. Instrum., 80, 043302.

Roy et al. (2020). Higher harmonic generation in interacting bosons in optical lattices. arxiv.org, Cornell University Library, 201 Olin Library Cornell University Ithaca, NY 14853.

Seres et al. (2005). Source of coherent kiloelectronvolt X-rays. Nature, 433, 596.

Uetake et al. (2001). Nonlinear optics with liquid hydrogen droplet. Proc. SPIE 4270, Laser Resonators IV, 19-28.

Wagner et al. (2010). Lithography gets extreme. Nature Photonics, 4, 24-26.

International Search Report for PCT/EP2021/074552 dated Jan. 4, 2022.

Yang et al. (2013). Growing metal nanoparticles in superfluid helium. Nanoscale, 5, 11545-11553.

Office Action issued Sep. 25, 2025 in European Application No. 20195288.4.

* cited by examiner

APPARATUS AND METHOD FOR GENERATING X-RAYS BY LASER IRRADIATION OF SUPERFLUID HELIUM DROPLETS

CROSS-REFERENCE TO RELATED APPLICATIONS

This application is a U.S. National Phase Application of PCT/EP2021/074552, filed Sep. 7, 2021, which claims priority to EP 20195288.4, filed Sep. 9, 2020, the contents of which applications are incorporated herein by reference in their entireties for all purposes.

FIELD OF THE INVENTION

The invention relates to an X-ray laser apparatus, being configured to generate X-rays by laser irradiation of a droplet-shaped converter material. Furthermore, the invention relates to a method of generating X-rays by non-linear frequency conversion, including laser irradiation of a droplet-shaped converter material. Applications of the invention are available e. g. in the fields of X-ray lithography (e. g. structuring process in semiconductor and microsystems technology), laser processing of materials, material investigations and X-ray imaging.

TECHNICAL BACKGROUND

In the present specification, reference is made to the following prior art illustrating the technical background of the invention, in particular relating to generating X-rays by non-linear frequency conversion:

[1] P. B. Corkum "Plasma perspective on strong field multiphoton ionization" in "Phys. Rev. Lett." 71, 1994 (1993);
[2] U.S. Pat. No. 7,729,403 B2;
[3] T. T. Luu et al. "Extreme—ultraviolet high—harmonic generation in liquids" in "Nat. Com-mun." 9, 3723 (2018);
[4] J. Seres et al. "Source of coherent kiloelectronvolt X-rays" in "Nature" 433, 596 (2005);
[5] C. Wagner et al. "Lithography gets extreme" in "Nature Photonics" 4, 24 (2010);
[6] U.S. Pat. No. 7,897,947 B2;
[7] U.S. Pat. No. 7,372,056 B2;
[8] U.S. Pat. No. 6,304,630 B1;
[9] S. Uetake et al. "Nonlinear optics with liquid hydrogen droplet" in "Proc. SPIE 4270, Laser Resonators IV" (24 Apr. 2001), p. 19; doi:10.1117/12.424665;
[10] K. von Haeften et al. "Size and Isotope Effects of Helium Clusters and Droplets: Identification of Surface and Bulk-Volume Excitations" in "J. Phys. Chem. A" 115, 7316 (2011);
[11] D. Pentlehner et al. "Rapidly pulsed helium droplet source" in "Rev. Sci. Instrum." 80, 043302 (2009); and
[12] M. Joppien et al. "Electronic Excitations in Liquid Helium: The Evolution from Small Clusters to Large Droplets" in "Phys. Rev. Lett." 71, 2654-2657 (1993).

To realize a high-power X-ray laser source on a laboratory scale, typically an intense laser pulse in the visible or near-infrared spectral range interacts with a converter material. In the course of this interaction, coherent short-wavelength X-ray laser light can be generated, wherein electrons are hit out of the converter material and gain significant energy in the light field of the driving laser. The high accumulated kinetic energy of the electrons in the laser field can be released as an X-ray pulse if the emitted high-energy electrons recombine with their atomic nuclei in the material in a phase-adapted manner [1]. This mechanism is known as "High-Harmonic Generation" (HHG) process. Typically, noble gas atoms (He, Ne, Ar, Kr, Xe) are used as converter material, which are prepared in gas cells, in gas capillaries or as effusive particle beams (e. g. [2]).

The following parameters substantially influence the X-ray generation. The signal strength $S_{HHG}$ of the X-ray source based on the generation of high harmonics (HHG) in gas scales with the particle density ρ in the converter, the conversion efficiency of the particles (atoms) A and the effective converter length L of the conversion medium according to $S_{HHG} \propto \rho^2 A^2 L^2$. However, the maximum usable converter length in which X-rays can be generated is limited by absorption and propagation effects.

Furthermore, the conversion efficiency is strongly dependent on the available intensity/of the driving laser and scales extremely unfavorably for long wavelengths in the mid-infrared. In particular, the shortest X-ray wavelength (maximum photon energy $E_{max}$), the so-called 'cut-off', is scaled with the square of the wavelength λ of the long wavelength laser field driving the HHG process and with the ionization potential $I_p$ of the converter material according to $$E_{max}[eV]=I_p[eV]+3\cdot 10^{-13}\cdot I[W/\mathrm{cm}^2]\cdot(\lambda[\mu\mathrm{m}])^2.$$

This means that on average, one has to invest several trillion times more photons to produce a single X-ray photon with conventional processes.

Thus, the HHG process is usually not very effective with an efficiency significantly less than $10^{-5}$ depending on the driving laser parameters, the converter material [3] and the wavelength of the X-ray laser ($\lambda^{-13}$ @ 1000 eV) to be achieved [4].

Similar considerations play an essential role in current $CO_2$ laser-pumped extreme ultraviolet (EUV) sources with a wavelength of 13.5 nm for lithographic applications. Here, microplasmas of liquid tin (Sn) are generated, which exhibit characteristic emission lines of highly charged ions (Snq+) in this spectral range ([5], [6], [7]). Alternatively, water droplets can be irradiated with laser pulses for creating EUV radiation [8]. However, the EUV pulses of these plasma sources have only a low temporal coherence and therefore a limited application range. Another non-linear frequency conversion by laser irradiation is described in [9], wherein hydrogen droplets are used as the converter material. However, the shortest wavelengths created on the basis of the underlying Raman scattering processes with the hydrogen droplets are limited to UV radiation.

Objective of the Invention

Objectives of the invention are to provide an improved X-ray laser apparatus and an improved method of generating X-rays, avoiding disadvantages of conventional techniques and/or providing new or extended applications of X-ray sources. In particular, the X-rays are to be generated with increased power, in particular increased product of X-ray pulse power and repetition rate, increased efficiency, increased photon energy and/or improved coherence.

SUMMARY OF THE INVENTION

The above objectives are solved by an X-ray laser apparatus and a method of generating X-rays of the invention.

According to a first general aspect of the invention, the above objective is solved by an X-ray laser apparatus, being configured to generate X-rays, comprising an excitation laser device arranged to generate driving laser pulses, and a converter material source device arranged to provide a drop-let-shaped converter material, which is capable of generating X-rays by non-linear frequency conversion in response to an irradiation with the driving laser pulses, wherein the excitation laser device is arranged for a focused irradiation of the droplet-shaped converter material.

According to the inventive X-ray laser apparatus, the converter material source device is configured to provide superfluid Helium droplets, which provide the converter material.

According to a second general aspect of the invention, the above objective is solved by a method for generating X-rays, comprising the steps of generating driving laser pulses with an excitation laser device, providing a droplet-shaped converter material with a converter material source device, and focused irradiation of the droplet-shaped converter material with the driving laser pulses, wherein the X-rays are generated by non-linear frequency conversion.

According to the inventive method, the converter material comprises superfluid Helium droplets. Preferably, the method is conducted with the X-ray laser apparatus according to a first general aspect of the invention or an embodiment thereof.

According to the invention, a pulse laser-driven, coherent X-ray emission is created by non-linear frequency conversion. The non-linear frequency conversion is based on electron recombination in superfluid Helium droplets. In particular, the non-linear frequency conversion is represented by a process of separating electrons from the Helium atoms by the irradiation with the driving laser pulses, accelerating the electrons in the light field of the driving laser pulses and recombination of the electrons with atomic Helium nuclei. The X-rays are created in a wavelength range covering extreme ultraviolet and soft X-rays as specified below. The term "X-rays" as used herein generally refers to a pulsed X-ray emission (or: X-ray beam) from irradiated Helium droplets. Due to the coherence of the generation process, the X-rays also can be called X-ray laser pulses.

With the inventive employment of superfluid Helium as converter material for X-ray generation, the following advantages compared to conventional techniques are obtained. Firstly, propagation and absorption effects in the converter material are small as droplet-shaped superfluid Helium is an optically thin material, in particular in a droplet jet from a nozzle jet expansion, and the number of electrons in superfluid Helium is relatively small, e. g. compared with metal droplets. Thus, the usable converter length can be increased. Secondly, the superfluid Helium droplets provide an extremely high local atomic density (e. g. $10^{23}$ particles per $cm^3$), compared to only $10^{20}$ particles per $cm^3$ in a conventional gas cell.) Accordingly, the particle density in the converter material is increased. Thirdly, the recombination cross section (cross-sectional area) of the superfluid Helium droplets is extremely large compared to the single atom in the gas phase as described with further details below with reference to FIGS. 3 and 4. As an advantageous result, in contrast to the low conversion efficiency of conventional processes, the conversion efficiency per ionization event can be increased by a factor of 100 or more. Furthermore, the superfluid Helium droplets allow to compensate for the dispersion of the electronic wave packet in the ionization continuum, which is unavoidable in particular in case of using a long-wavelength emitting excitation laser device.

As a further substantial advantage, X-rays with photon energies in a spectral range between about 280 eV and 530 eV (so-called "water window") can be created. This spectral range is characterized by a high transparency of water, whereas carbon, nitrogen and other important elements in molecular biology are strongly absorbed here. Thus, the invention has advantageous imaging applications, in particular for investigating biological functional principles in a natural watery environ-ment with a high contrast and in a location- and element-specific manner.

The term "superfluid Helium" refers to liquid Helium in a superfluid state, i. e. with physical state conditions wherein Helium is a Bose quantum liquid, in particular with viscosity equal to zero. Superfluid Helium used according to the invention preferably comprises the isotope Helium-4. Superfluid Helium droplets comprise free-space drops of Helium, preferably created as a sequence of single droplets or as a pulsed beam of droplet groups (clusters). The superfluid Helium droplets may exclusively consist of Helium. Alternatively, the superfluid Helium droplets may consist of Helium and at least one dopant (doped droplets). Advantageously, dopants may provide nucleation centers facilitating ionization events and increasing X ray conversion efficiency. Preferably, dopants comprise substances with ionisation potential below the ionisation potential of Helium. The converter material source device creates the superfluid Helium droplets in vacuum or a surrounding of reduced pressure (pressure below atmospheric pressure).

According to preferred embodiments of the invention, the converter material source device is configured to provide the superfluid Helium droplets with at least one of the parameters comprising droplet diameters in a range of 10 nm to 10 μm and an atomic density of at least $10^{23}$ atoms per $cm^3$ in the superfluid Helium droplets. These preferred parameter ranges have advantages in terms of efficiency of X-ray generation and power of X-rays, in particular for providing high conversion efficiency in an optically relatively thin medium with negligible propagation effects (losses).

According to further preferred embodiments of the invention, the converter material source device comprises a nozzle device, a pressure device, a cooling device and a Helium reservoir, wherein the cooling device is arranged to cool the nozzle device to a temperature in a preferred range from 6 K to 300 K, in particular from 6 K to 80 K, the pressure device is configured for applying the Helium to the nozzle device with a pressure in a range from 100 mbar to 100 bar, and the nozzle device comprises a nozzle which opens into a space with a pressure lower than $10^{-2}$ mbar and is configured to generate the superfluid Helium droplets by jet expansion. Advantageously, these parameter ranges have been described in the scientific literature already (see in particular [10], [11] and [12]). Furthermore, with these parameter ranges, superfluid Helium can be created with sufficient stability and homogeneity. As a further advantage, available cooled expansion nozzle systems can be employed as the converter material source device, which has a relatively simple structure for setting the superfluid state of the superfluid Helium.

Preferably, the converter material source device is configured to provide the superfluid Helium droplets as a continuous droplet flow or as a pulsed beam of droplet groups, particularly preferred with tunable droplet density. Under extreme operation conditions, the continuous droplet flow can comprise a continuously created sequence of successive, in particular equidistant, single droplets being separated from each other, i. e. the term "continuous" refers to the operation of the converter material source device. Creating the continuous droplet flow has particular advantages in terms of creating the X-rays as a pulse sequence, because the repetition rate of the x-ray laser is determined by the repetition rate of the driving laser up to 100 MHz. The pulsed beam of droplet groups comprises single or successive packets or clouds each with multiple superfluid Helium droplets. For creating the pulsed beam of droplet groups, the converter material source device can be configured for a single shot (in particular) on-demand or for a continuous operation, e. g. with a frequency in a range from single-shot to 500 Hz. Creating the pulsed beam of droplet groups may have particular advantages in terms of obtaining high X-ray pulse energy.

With a further preferred variant of the invention, at least one of the excitation laser device and the converter material source device can be provided with a positioning device with the superfluid Helium droplets and the driving laser pulses can be positioned relative to other. Advantageously, the positioning device provides an optimum mutual adjustment of the laser pulses and the droplets, so that the efficiency of creating the X-rays is increased.

According to further preferred embodiments of the invention, the excitation laser device is configured to generate the driving laser pulses with at least one of the parameters comprising a repetition rate in a range from 10 Hz to 100 MHz, a pulse duration t in a range from 1 fs to 5 ps, a wavelength in a range from 200 nm to 20 μm, and a focus intensity in the droplet-shaped converter material greater than $10^{13}$ W/cm$^2$.

The above preferred repetition rate of the driving laser pulses has particular advantages for obtaining sequences of X-ray pulses with equally high repetition rate, particularly representing qua-si-continuous X-rays, with high power. The problem of the low conversion efficiency in conventional techniques is addressed by the repetition rate of the driving laser pulses as the average HHG X-ray laser power $\hat{P}_{HHG}$ results from the product of pulse energy ($E_{HHG}$) and pulse repetition rate ($f_{HHG}$) $\hat{P}_{HHG}=E_{HHG}\cdot f_{HHG}$ The increased pulse repetition rate $f_{HHG}$ provides an increased number of X-ray laser pulses per second and in particular allows an improvement of the statistical significance of a measurement using the X-rays, which can be achieved in a measurement period, thus reducing the required process time (material processing, coincidence experiments).

The short range of laser pulses with only a few optical cycles in the above preferred range of pulse durations τ advantageously allow the creation of X-ray pulses with extremely increased achievable pulse peak power $$P_{HHG} = \frac{E_{HHG}}{\tau}$$

and extremely broadband X-rays. With increasing the pulse peak power, the effectiveness of light-matter interaction per X-ray pulse can be increased. In particular, ultrashort X-ray pulses with pulse widths in a range below 100 attoseconds (as), in particular below 50 as can be realized. In addition, using the long range of laser pulses towards 1 ps advantageously allows for efficient generation of particularly narrow-band X-rays with spectral bandwidth <0.1%.

The above preferred wavelengths in the infrared spectrum, in particular the mid-infrared laser pulse wavelengths allow the cut-off to be shifted far into the X-ray range. In particular in the MIR range, the achievable average X-ray laser power at maximum X-ray photon energy $\hat{P}_{HHG}$ scales with the average power $\hat{P}_{MIR}$ of the used MIR laser, its wavelength $\lambda_{MIR}$; and the conversion efficiency η according to $\hat{P}_{HHG}$@cut-off=$\eta\cdot\hat{P}_{MIR}$(λMIR). Preferably, the X-rays are generated in a spectral range between 100 eV and 1000 eV photon energy. In particular, extremely high photon energies of up to 2000 eV (X-ray wavelength HHG=1.2 nm) or even beyond this energy can be achieved with the HHG process.

Advantageously, the above preferred output power of the driving laser pulses can be obtained with current high power laser sources, which offer outputs of more than 100 W in the near-infrared (NIR) and more than 2 W in the mid-infrared (MIR). Providing the above preferred high focus intensity has advantages in terms of obtaining a high power of the created X-rays.

According to a further advantageous embodiment of the invention, the excitation laser device is configured to generate the driving laser pulses with a beam profile having a predominantly flat intensity distribution in time and/or space. The driving laser pulses preferably have the beam profile with the predominantly flat intensity distribution during the irradiation of the superfluid Helium droplets. The driving laser pulses preferably have a constant intensity of a wide range, in particular over at least a half, of the beam profile. The flat intensity distribution, which is also called rectangular intensity distribution, advantageously improves the optical coupling of the driving laser pulses into the Helium droplets. The inventors suggest that the use of flat-top driving laser pulses improves the efficiency of creating the X-rays by at least magnitude factor 2 to 4. This idea has been derived from experiences with influencing frequency conversion, in particular influencing the efficiency of frequency doubling and tripling, in nonlinear crystals by the spatial intensity distribution of the laser pulses. The efficiency is significantly increased when flat-top distributions with constant intensity are realized over a wide range of the beam profile. This becomes more relevant the higher the order of the non-linear process as it is the case with the generation of high harmonics in the X-ray region, which is extremely non-linear.

Alternatively, another beam profile of the driving laser pulses in time and/or space, like e. g. a Gaussian beam profile, can be employed. Although mainly the central part of the intensity distribution of the driving laser pulses contributes to the frequency conversion in this case, advantages in terms of omitting beam profiling components of the excitation laser device can be obtained.

If, according to another preferred embodiment of the invention, a focusing device is provided which is configured to focus the X-rays, particular advantages for the application of the X-rays are obtained, especially in terms of spatial resolution, e. g. in lithography or imaging applications.

Preferably, the excitation laser device and the converter material source device are operated synchronously. Synchronous operation includes matching the repetition rate of the driving laser pulses and the rate of generating the Helium droplets such that the rates are equal or have an even-numbered ratio. Accordingly, the efficiency of using the superfluid Helium can be improved. For providing the synchronous operation, the X-ray laser apparatus preferably is provided with a control device commonly controlling both of the excitation laser device and the converter material source device.

In summary, the inventors have found for the first time that superfluid Helium droplets, preferably with a droplet size, e. g. of droplets in a sequence or in clusters, in the range of 10 nm to 10 μm in diameter, can be used as an advantageous converter material for the non-linear frequency conversion of a preferably relatively long-wavelength (UV-IR) driving laser pulse at a repetition rate in the range 10 Hz to 100 MHz. The condensed particle beam preferably is prepared in a controlled jet expansion at defined stagnation pressures (e. g. 100 mbar to 100 bar) and temperatures at the gas nozzle (6 to 300 K). As a substantial advantage of the invention 1000-fold higher average power of an X-ray laser with high repetition rate up to 100 MHz can be obtained based on "High-Harmonic Generation (HHG)" in the quantum liquid drop compared to HHG on conventional gas cells, liquid jets and nanoparticles. Non-linear frequency conversion using HHG on the Helium droplets offers a number of decisive advantages for the generation of ultrashort X-ray pulses on a laboratory scale. In the HHG process, the coherent X-ray emission is based on the 3-step model developed by Paul Corkum in the 1990s [1].

Compared with conventional techniques, with an e. g. 200-fold higher repetition rate, the required process time (material processing, coincidence experiments) is reduced up to 200 times. For many applications, an e. g. 1000-fold higher average power output means a corresponding 1000-fold increase in efficiency. In processes for nanostructuring in semiconductor and microsys-tem technology, the transition from EUV lithography (13.5 nm) to X-ray lithography (<4.5 nm) represents a substantial progress in the achievable information density per chip.

Further applications are available in various areas of natural and life sciences, where an under-standing of molecular processes is of paramount importance. Coincidence measurements make it possible to study the structure and function of complex molecules during a reaction chain. Electronic and geometric structural changes are recorded like in a movie. Ultra-short laser pulses play a key role here. They are used for selective excitation of characteristic degrees of freedom of movement ("fingerprint region" in the mid-infrared) as well as for element- and site-specific interrogation of the induced reaction by means of ionization ("water window" in the X-ray range). The reaction products are simultaneously (coincidentally) detected and individually characterized. Since only one ionization process per laser pulse may be recorded at most, an extremely large number of individual measurements is necessary to obtain sufficient data statistics. With the inventive technique, in particular by using a high-power femtosecond laser as excitation laser device and high stability of X-ray generation, measurement times can be reduced to a few hours. As a result, considerably more complex experiments can be performed much more efficiently.

BRIEF DESCRIPTION OF THE DRAWINGS

Further details and advantages of the invention are described in the following with reference to the attached drawings, which schematically show in.

PREFERRED EMBODIMENTS OF THE INVENTION

Figure 1:
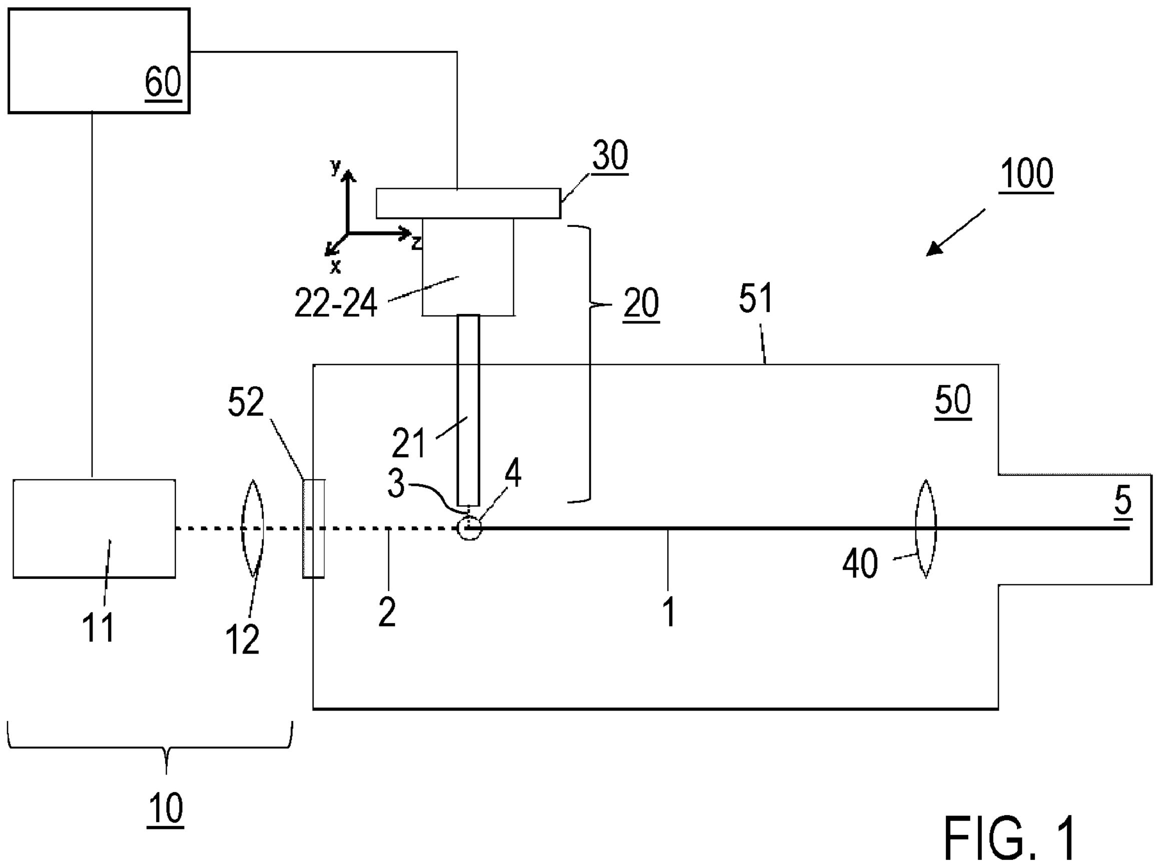
FIG. 1: an overview of the X-ray laser apparatus according to an embodiment of the invention.

FIG. 1 shows the main components of an embodiment of an inventive X-ray laser apparatus 100, including an excitation laser device 10, a converter material source device 20, a positioning device 30, a focusing device 40, a vacuum chamber 50, and a control device 60, like a control computer unit.

In the vacuum chamber 50, the X-rays 1 are created by focussed irradiation of superfluid Helium droplets 3 with driving laser pulses 2 in a target interaction area 4. The vacuum chamber 50 comprises a schematically shown chamber wall 51 and a chamber window 52 transmitting the driving laser pulses 2, and it is connected with pumping device, like a turbo-molecular pump or similar device, to achieve vacuum conditions, and with control devices (not shown). The vacuum chamber 50 preferably allows for pressure of equal to or below $<10^{-2}$ mbar, thus supporting a high transmission of the generated beam X-rays 1. The chamber window 52 should have a high transmission for the wavelength of the driving laser pulses 2. It is preferably attached to the chamber wall 51 in a way that the vacuum inside is maintained and the light source beam can be guided inside the vacuum chamber 50.

Furthermore, the vacuum chamber 50 may include an application area 5 being configured for an interaction of the generated X-ray beam 1 and having experimental measurement equipment and/or instruments that are operated in vacuum. In the application area 5, the X-rays 1 are ap-plied, e. g. for lithography, material processing or imaging tasks. Alternatively, the application area 5 can be arranged separately from the vacuum chamber 50 in an evacuated space connected with the vacuum chamber 50 via evacuated X-ray optics.

The excitation laser device 10 includes a laser source 11 and a focusing element 12. The laser source 11 includes a laser oscillator and optically non-linear components, like an amplifier, an optical-parametric device, a difference-frequency generation device, a sum-frequency generation device and/or a nonlinear spectral broadening device. The laser oscillator and the optically non-linear components are configured for creating coherent optical driving laser pulses 2 in a spectral range between ultraviolet (UV) to infrared (IR). The laser source wavelength can emit a fixed or tunable wavelength (centre wavelength of the driving laser pulses). The excitation laser device 10 comprises e. g. a laser source of the type Supernova OPCPA or Supernova DFG (manufactured by Class 5 Photonics GmbH, Germany).

The focusing element 12 can be at least one of at least one lens and at least one mirror, e. g. of parabolic, elliptical and/or spherical shape, or a free-form focusing element. The focusing element 12 is adapted for transmission of the wavelength emitted by the laser source 10. With the focusing element 12, driving laser pulses 2 are created with a focal spot in the target interaction area 4 with an intensity preferably larger than $10^{13}$ W/cm$^2$. The focusing element 12 can be placed inside or outside the vacuum chamber 50, i. e. it can be swapped with the chamber window 52, or the focusing element 12 simultaneously may provide the chamber window. Alternatively, the focusing element 12 can be omitted if the focussing function is fulfilled by an output component of the laser source 10.

Figure 2:
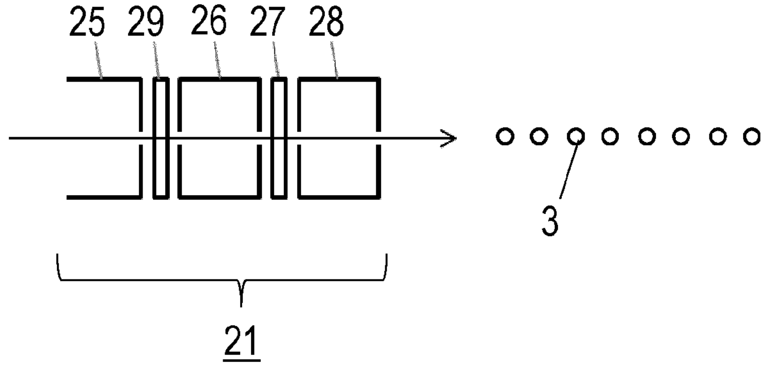
FIG. 2: a nozzle device of the converter material source device included in the X-ray laser apparatus of FIG. 1.

The converter material source device 20 comprises a nozzle device 21, which is illustrated with further details in FIG. 2, and a schematically illustrated arrangement of a pressure device 22, a cooling device 23, e. g. cryostat, and a Helium reservoir 24, like a gas bottle with an adjustable valve. Depending on the operation conditions, the converter material source device 20 provides a fluid droplet source or cluster source, i. e. it creates liquid helium droplets 3 or liquid helium clusters, in particular a continuous or pulsed beam of cryogenically cooled liquid helium droplets or atomic Helium clusters. Additionally, pressure and temperature sensors (not shown) are provided, which are coupled with the control device 60 for controlling the operation of the converter material source device 20, in particular for stabilizing the nozzle temperature of the nozzle device 21.

As schematically shown in FIG. 2, the nozzle device 21 comprises a cold head 25, a nozzle holder 26 and a nozzle 27 equipped with a nozzle cap 28 and a nozzle filter 29. The cold head 25 is a section of the cooling device 23, i. e. it has the temperature set at the cooling device 23. Both of the cold head 25 and the nozzle holder 26 are preferably made of copper or a material with similar heat conductivity so that the temperature measured at the cold head 25 of the cooling device 23 corresponds to the nozzle temperature. The nozzle holder 26 and cold head 25 are sealed with indium. The nozzle filter 29 between the cold head 25 and the nozzle holder 26 is a sinter filter (filter made of a porous sinter material to protect the nozzle from contamination. The nozzle 27 is a perforated nozzle plate with a nozzle diameter between 5 μm and 20 μm, and it is pressed by means of the nozzle cap 28 against the nozzle holder 26 and again sealed with indium. High-purity Helium gas is expanded into the vacuum in the vacuum chamber 50 under high pressure<100 bar and cryogenic temperatures>6 K.

The superfluid condition of the Helium droplets 3 is set by controlling pressure and temperature of the Helium at the nozzle 27 just before the expansion onto the vacuum, using the control device 60. Particular pressure and temperature settings for creating the superfluid state of Helium are obtained from tests or available reference tables (phase diagram). The average droplet size and/or the creation of clusters can be controlled by pressure and temperature control as well (see [10]).

The positioning device 30 comprises an xyz-positioner being adapted for moving the converter material source device 20, in particular the nozzle device 21 thereof, with μm or down to nm steps in all spatial directions relative to the excitation laser device 10. The positioning device 30 allows for precise positioning of the target area 4 with respect to the focus of the incoming driving laser pulses 2, in order to optimize the higher-harmonic generation conversion yield. Alternatively or additionally, an optical component of the excitation laser device 10 can be provided with a positioning device (not shown) for adjusting the position of the focal spot of the driving laser pulses 2 in the target interaction area 4.

The focusing device 40 comprises e. g. a lens or a mirror of parabolic, elliptical or spherical shape, or a free-form focusing element optimized for the characteristics of the generated X-rays 1, e. g. extreme ultraviolet to soft x-ray spectral range. It can be configured to focus or collimate or guide the generated X-rays 1 to a vacuum beam line for an experimental apparatus in the application area 5.

In operation of the X-ray laser apparatus 100, the beam of driving laser pulses 2 from the ultra-short coherent laser source 11 is focused with the focusing element 12 and guided through the optical chamber window 52, with focus in the target interaction area 4. The converter material target is produced by the converter material source device 20, producing a dense macroscopic sequence of superfluid Helium droplets or clusters. The focused driving laser pulses 2 are con-verted to the generated beam of X-rays 1 by the interaction with the superfluid Helium droplets or clusters by the HHG process, further illustrated in FIGS. 3 and 4. The generated beam of X-ray 1 has a spectral range that extends far into the extreme ultraviolet and soft x-ray regime. The generated beam can be focused by the focusing device 40 to the application area 5. Depending on the operation of the laser source 11 with fixed or tuneable wavelength, the X-ray laser apparatus 100 provides a pulsed beam of X-rays 1 with fixed or tunable wavelength.

Figure 3:
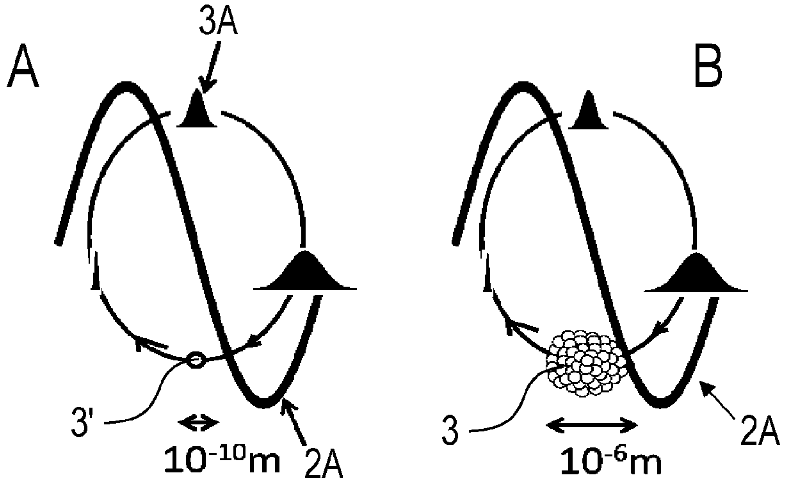
FIGS. 3 and 4: illustrations of generating X-rays by the non-linear frequency conversion of driving laser pulses.

FIG. 3 illustrates the interaction of the light field 2A of the driving laser pulses with single atoms 3' (FIG. 3A, prior art) in comparison with superfluid Helium droplets 3 (FIG. 3B, invention). With the diameter of single atoms 3' of about $10^{-10}$ m (FIG. 3A), the probability of interacting with the light field is essentially smaller than with the diameter of Helium droplets 3 of about $10^{-6}$ m. Furthermore, since the recombination cross section of the Helium droplets 3—characterized by the cross-sectional area thereof—is extremely large compared to the individual atom 3' in the gas phase, the conversion efficiency per ionization event and thus the X-ray pulse energy $E_{HHG}$ is significantly increased.

Additionally, a high conversion efficiency is achieved as the Helium droplets provide an optically relatively thin medium with negligible propagation effects (losses). Thus, it is compensated for the dispersion of the electronic wave packet 3A in the ionization continuum, which is unavoidable due to the use of a long-wavelength driving laser pulses. The reduced recombination efficiency due to the divergence of the wave packet is compensated by the large increase in the recombination area of the droplet compared to the atomic cross section. This drastically increases the yield of X-ray light.

Figure 4:
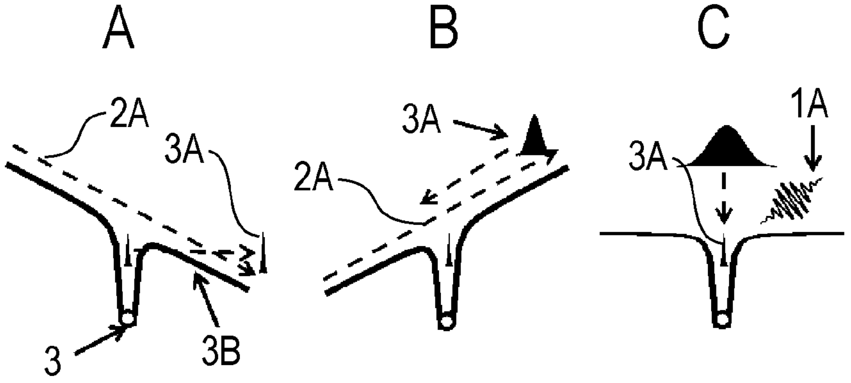

FIG. 4 shows details of the non-linear frequency conversion, including the 3 steps of ionization of electron wave packets 3A in the light field 2A of the driving laser pulses, e. g. MIR laser pulses, so that the electron wave packets 3A leave the atomic potential 3B of Helium atoms in the droplet 3 (FIG. 4A), propagation and energy accumulation of the electron wave packets 3A in the light field 2A of the driving laser pulses (FIG. 4B) and recombination of the emitted electron wave packet 3A in the field of the driving laser pulses with the release of an X-ray photon 1A (FIG. 4C). The strong light field 2A of the driving laser pulses, e. g. in the mid-infrared, leads to a "bending" of the atomic potential 3B. The medium (liquid droplet 3) is ionized and the emitted electrons are accelerated in the laser field 2A. X-ray pulses 1A are created by recombining high-energy electrons with the atomic nuclei.

The features of the invention disclosed in the above description, the drawings and the claims can be of significance individually, in combination or sub-combination for the implementation of the invention in its different embodiments.

The invention claimed is:

1. An X-ray laser apparatus, being configured to generate coherent X-rays, comprising an excitation laser device arranged to generate driving laser pulses having a pulse duration in a range from 1 fs to 5 ps, and a converter material source device arranged to provide a droplet-shaped converter material, which is capable of generating the coherent X-rays by non-linear frequency conversion in response to an irradiation with the driving laser pulses, wherein the excitation laser device is arranged for a focused irradiation of the droplet-shaped converter material, and the converter material source device is configured to provide superfluid Helium droplets, which provide the droplet-shaped converter material, wherein the Helium has physical state conditions wherein the Helium is in a superfluid state and the Helium has a viscosity equal to zero, wherein the non-linear frequency conversion is represented by a coherent process of separating electrons from Helium atoms of the superfluid Helium droplets by the irradiation with the driving laser pulses, accelerating the electrons in the light field of the driving laser pulses and recombination of the electrons with atomic Helium nuclei.

2. The X-ray laser apparatus according to claim 1, wherein the converter material source device is configured to provide the superfluid Helium droplets with at least one of (a) droplet diameters in a range of 10 nm to 10 μm and (b) an atomic density of at least $10^{23}$ atoms per $cm^3$ in the superfluid Helium droplets.

3. The X-ray laser apparatus according to claim 1, wherein the converter material source device comprises a nozzle device, a pressure device, a cooling device and a Helium reservoir, wherein the cooling device is arranged to cool the nozzle device to a temperature in a range from 6 K to 300 K, the pressure device is configured for applying Helium to the nozzle device with a pressure in a range from 100 mbar to 100 bar, and the nozzle device comprises a nozzle which opens into a space with a pressure lower than $10^{-2}$ mbar and is configured to generate the superfluid Helium droplets by jet expansion.

4. The X-ray laser apparatus according to claim 1, wherein the converter material source device is configured to provide the superfluid Helium droplets as a continuous droplet flow or as a pulsed beam of droplet groups.

5. The X-ray laser apparatus according to claim 1, wherein at least one of the excitation laser device and the converter material source device is provided with a positioning device so that the superfluid Helium droplets and the driving laser pulses can be positioned relative to other.

6. The X-ray laser apparatus according to claim 1, wherein the excitation laser device is configured to generate the driving laser pulses with at least one of (a) a repetition rate in a range from 10 Hz to 100 MHZ, (b) a wavelength in a range from 200 nm to 20 μm, and (c) a focus intensity in the droplet-shaped converter material greater than $10^{13}$ W/$cm^2$.

7. The X-ray laser apparatus according to claim 1, wherein the excitation laser device is configured to generate the driving laser pulses with a beam profile having a predominantly flat intensity distribution.

8. The X-ray laser apparatus according to claim 1, further comprising a focusing device which is configured to focus the coherent X-rays.

9. A method for generating coherent X-rays, comprising the steps of generating driving laser pulses with an excitation laser device, providing a droplet-shaped converter material with a converter material source device, and focused irradiation of the droplet-shaped converter material with the driving laser pulses, wherein the coherent X-rays are generated by non-linear frequency conversion using the X-ray laser apparatus according to claim 1, and the droplet-shaped converter material comprises superfluid Helium droplets, wherein the Helium has physical state conditions wherein the Helium is in a superfluid state.

10. A method for generating coherent X-rays, comprising the steps of generating driving laser pulses with an excitation laser device, said driving laser pulses having a pulse duration in a range from 1 fs to 5 ps, providing a droplet-shaped converter material with a converter material source device, and focused irradiation of the droplet-shaped converter material with the driving laser pulses, wherein the coherent X-rays are generated by non-linear frequency conversion, wherein the droplet-shaped converter material comprises superfluid Helium droplets, wherein the Helium has physical state conditions wherein the Helium is in a superfluid state and the Helium has a viscosity equal to zero, and the non-linear frequency conversion is represented by a coherent process of separating electrons from Helium atoms of the superfluid Helium droplets by the irradiation with the driving laser pulses, accelerating the electrons in the light field of the driving laser pulses and recombination of the electrons with atomic Helium nuclei.

11. The method according to claim 10, wherein the superfluid Helium droplets have at least one of (a) droplet diameters in a range of 10 nm to 10 μm and (b) an atomic density of at least $10^{23}$ atoms per $cm^3$.

12. The method according to claim 10, wherein the excitation laser device has at least one of (a) a repetition rate in a range from 10 Hz to 100 MHz, (b) a pulse duration in a range from 1 fs to 1 ps, (c) a wavelength in a range from 200 nm to 20 μm, and (d) a focus intensity in the droplet-shaped converter material greater than $10^{13}$ W/$cm^2$.

13. The method according to claim 10, wherein the driving laser pulses during irradiation of the superfluid Helium droplets have a beam profile with a predominantly flat intensity distribution.

14. The method according to claim 10, wherein the coherent X-rays are generated in a spectral range between 10 eV and 2000 eV photon energy.

15. The method according to claim 10, wherein the excitation laser device and the converter material source device are operated synchronously.

* * * * *